(No Model.)

W. A. LEGGO, Jr.
VEHICLE BRAKE.

No. 577,383.

Patented Feb. 16, 1897.

WITNESSES:
Frank S. Ober
Harry Bailey

INVENTOR
William A. Leggo, Jr.
BY
Wm. A. Rosenbaum
ATTORNEY

UNITED STATES PATENT OFFICE.

WILLIAM A. LEGGO, JR., OF HARTSDALE, NEW YORK, ASSIGNOR OF ONE-FOURTH TO THE LONG ISLAND RUBBER AND CYCLE COMPANY, OF NEW YORK.

VEHICLE-BRAKE.

SPECIFICATION forming part of Letters Patent No. 577,383, dated February 16, 1897.

Original application filed May 11, 1896, Serial No. 590,972. Divided and this application filed August 13, 1896. Serial No. 602,611. (No model.)

*To all whom it may concern:*

Be it known that I, WILLIAM A. LEGGO, Jr., a subject of the Queen of Great Britain, residing at Hartsdale, in the county of Westchester and State of New York, have invented certain new and useful Improvements in Vehicle-Brakes, of which the following is a full, clear, and exact description.

The object of this invention is to produce a brake for vehicle-wheels, more particularly adapted for cycles, that will be automatic in its action to the extent that whenever a retarding or back-pedaling effort of sufficient force is exerted by the rider the brake will take effect.

A further object of the invention is to produce a brake of this character simple and strong in construction, readily and cheaply made, and presenting but little evidence of its presence to the eye.

This brake is adapted to be applied to a wheel of a cycle which is driven by a chain or other gear from the pedal-shaft.

Figure 1:
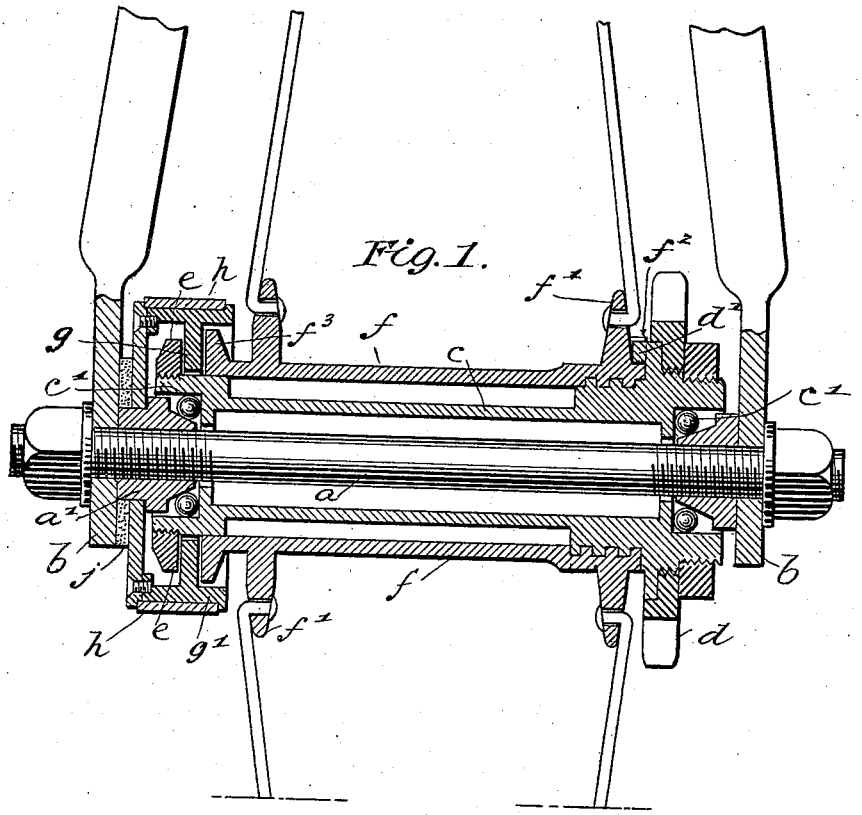
Figure 2:
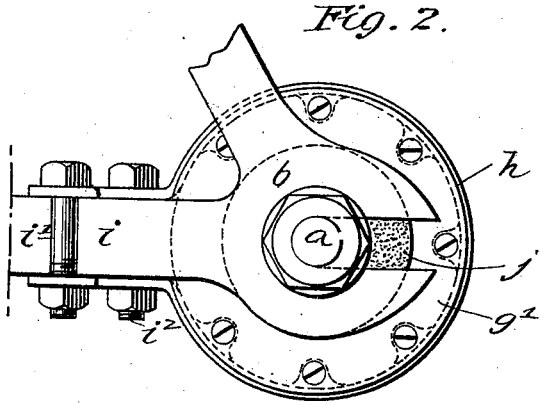

Referring to the accompanying drawings, Figure 1 is a central section through the hub of a rear wheel of a bicycle, showing portions of the spokes of the wheel and of the frame of the cycle; and Fig. 2 is an end or side view of the hub.

Referring to the drawings by letter, $a$ represents the axle of a wheel. It is held stationarily in the ends of the fork $b$ of the frame of the bicycle.

$c$ is the hub, running, with ball-bearings $c'$, upon the axle. This hub carries at one end the usual small sprocket-wheel $d$ and at the opposite end a fixed flange $e$. Surrounding the hub $c$ is an auxiliary hub $f$, upon which the spoke-flanges $f'$ are formed. The main and auxiliary hubs are provided, respectively, with external and internal screw-threads in engagement with each other in such manner that a rotation of one with respect to the other will create a lateral or longitudinal relative movement of them. The auxiliary hub is provided with a lug $f^2$, preferably formed on one of the spoke-flanges $f'$, and the main hub is provided with a lug $d'$, preferably formed on the sprocket-wheel $d$. While the cycle is being propelled forward the lug $d'$ is pressing against lug $f^2$, thus causing the main and auxiliary hubs to rotate together. If the sprocket-wheel is retarded while the cycle is in motion, the lugs separate and thus cause the differential rotation and the lateral movement referred to. The end of the auxiliary hub opposite the screw-thread is formed with a flange $f^3$, facing the stationary flange $e$, and between these two flanges stands an annular ring or web $g$, projecting inward from a drum $g'$, which is loosely supported upon the cone $a'$ on the axle $a$. This drum is surrounded by a friction-strap $h$, the ends of which, for convenience, are fastened to the lower brace $i$ of the cycle-frame, as shown in Fig. 2, by means of two bolts $i'$ and $i^2$, the latter of which may be used to adjust the tension of the strap upon the surface of the drum. A disk of rubber $j$ or other suitable spring material is inserted between the drum and the cycle-frame to hold the web $g$ normally out of contact with the flange $e$.

When the brake is to be put into operation, the rider exerts back-pedaling pressure, which allows the auxiliary hub to travel forward, thus separating the lugs $f^2$ and $d'$. This differential rotation, by reason of the screw-threaded connection between the two hubs, causes the auxiliary hub to move laterally to the left and forces its flange $f^3$ against the web of the drum and the latter against flange $e$. The friction between the flanges and the web retards the wheel in proportion to the force of the back-pedaling action, which, if increased, will cause the drum to move with the flange and so add the retarding action of the strap $h$ upon the drum. If the feet of the rider are removed from the pedals, the brake will continue in action and will remain in action until forward pedaling is again resumed and the lugs $f^2$ and $d'$ again brought together.

It is calculated that a small fraction of an inch will be sufficient movement of the auxiliary hub to set or release the brake, and this will not materially interfere with the running of the wheel.

This application is a division of another application filed by me May 11, 1896, Serial No.

590,972, and no claim is made herein to the broad idea of two rotating members mounted adjacent to a brake-surface and connected together by a screw-thread or its equivalent whereby a rotary movement of one member relative to the other member operates to move one of them laterally into contact with the brake-surface.

Having thus described my invention, I claim—

1. A brake for vehicles consisting of a wheel-hub to which the driving power is applied, an auxiliary hub to which the spokes of the wheel are attached, a frictional surface carried by each hub, corresponding frictional surfaces against which the former surfaces are adapted to bear, in combination with means for creating relative lateral movement of the two hubs whereby the said corresponding friction-surfaces are caused to move toward or away from each other.

2. A brake for vehicles consisting of a wheel-hub to which the driving power is applied, an auxiliary hub to which the spokes of the wheel are attached, a friction-flange carried by each hub, an element located between said flanges and adapted to be clamped thereby to create friction, in combination with means for creating relative lateral movement of the two hubs whereby the said flanges may be caused to clamp or release said intervening element for the purpose set forth.

3. A brake for vehicles consisting of a wheel-hub to which the driving power is applied, an auxiliary hub to which the spokes of the wheel are attached, a friction-flange carried by each hub, a drum located between said friction-flanges and adapted to be clamped or released thereby, a friction-strap upon the drum, the tension of which retards the rotation of the drum, in combination with means for creating relative lateral movement of the two hubs whereby the drum may be clamped or released by the flanges, substantially as described.

4. In a cycle-brake, the combination of a hub carrying a sprocket or other gear wheel for transmitting propelling power thereto, an auxiliary hub surrounding the first hub to which the spokes of the wheel are attached, interlocking lugs between the main and auxiliary hubs, whereby one is driven by the other, a screw-threaded connection between the two hubs whereby differential rotation of them will create relative lateral movement, a brake-drum surrounded by a brake-strap, a flange or web carried by said drum, and a flange on each of said hubs between which that on the drum is clamped when the two drums move laterally with respect to each other.

In testimony whereof I subscribe my signature in presence of two witnesses.

WILLIAM A. LEGGO, Jr.

Witnesses:
FRANK S. OBER,
HARRY BAILEY.